United States Patent [19]

Doutt

[11] Patent Number: 4,880,032
[45] Date of Patent: Nov. 14, 1989

[54] MULTIPLE PORT VALVE

[76] Inventor: Kingsley A. Doutt, P.O. Box 888, Alpena, Mich. 49707

[21] Appl. No.: 368,801

[22] Filed: Jun. 20, 1989

[51] Int. Cl.[4] .................... F16K 5/18; F16K 11/085
[52] U.S. Cl. ........................... 137/625.19; 137/595; 251/314
[58] Field of Search ............. 137/595, 625.19, 625.24; 251/309, 312, 314

[56] References Cited

U.S. PATENT DOCUMENTS

| | | | |
|---|---|---|---|
| 1,681,394 | 8/1928 | Carlson | 137/601 |
| 2,088,632 | 8/1937 | Benjamin | 137/625.19 |
| 2,125,542 | 8/1938 | Catterlin | 137/595 X |
| 2,154,945 | 4/1939 | Kyes | 137/625.19 |
| 2,164,295 | 6/1939 | Mott | 137/595 X |
| 2,334,875 | 11/1943 | Hufferd | 137/595 |
| 2,663,315 | 12/1953 | Snyder | 137/614.01 |
| 2,868,499 | 1/1959 | Kaminsky | 251/314 |
| 3,530,892 | 9/1970 | Charlop | 137/625.19 |
| 3,552,439 | 1/1971 | Siver | 251/309 X |
| 3,945,603 | 3/1976 | Fraser | 137/625.24 X |
| 4,511,120 | 4/1985 | Conley et al. | 251/312 X |
| 4,789,000 | 12/1988 | Aslanian | 251/309 X |

FOREIGN PATENT DOCUMENTS 1452637  9/1966  France .............. 137/625.19

Primary Examiner—John Rivell
Attorney, Agent, or Firm—Harpman & Harpman

[57] ABSTRACT

A multiple port valve body has a cylindrical bore with at least two pairs of oppositely disposed inlet and outlet ports communicating therewith and a cylindrical valve member rotatably positioned in said cylindrical bore. Transverse passageways in the cylindrical valve member register with the inlet and outlet ports in a first position and oversize resilient elastic rubber plugs under compression are positioned in oppositely disposed pockets in the cylindrical valve member register with said inlet and outlet ports when the cylindrical valve member has been rotated on its axis approximately 90° to a second position, the resilient elastic rubber plugs acting to bulge into the inlet and outlet ports to insure positive sealing thereof.

6 Claims, 2 Drawing Sheets 4,880,032

MULTIPLE PORT VALVE

BACKGROUND OF THE INVENTION

1. Technical Field

This invention relates to multiple port valves particularly useful in controlling coolant supply and return lines associated with electrical resistant welding apparatus wherein the coolant liquid must be discontinued when the welding tips are replaced.

2. Description of the Prior Art

No specific prior art is known wherein a cylindrical valve member in a cylindrical bore in a valve body is provided with transverse passageways registrable with inlet and outlet openings whereby coolant fluid supply and return lines may be simultaneously closed and/or opened and wherein compressed resilient elastic rubber plugs in the cylindrical valve member circumferentially spaced with respect to the transverse passageways are movable into an expanded sealing relation with said inlet and outlet ports when the cylindrical valve member is rotated on its longitudinal axis.

U.S. Pat. Nos. 1,681,394, 2,088,632, 2,154,945, 2,663,315, 3,530,892, 2,868,499, and French Pat. No. 1,452,637 all disclose valve structures in which rotatable cylindrical valve members are employed. None of the patents disclose the use of compressed resilient elastic rubber plugs mounted in a cylindrical valve body so as to be movable into expanded engagement with oppositely disposed inlet and outlet ports to positively seal the same. Metal to metal surfaces of rotatable valve members and inlet and outlet ports are seen in U.S. Pat. No. 1,681,394, cut-away areas of a cylindrical valve member are seen in U.S. Pat. No. 2,088,632 substantially transverse passageways in a rotatable valve member are seen in U.S. Pat. Nos. 2,154,945 and 2,663,315. In U.S. Pat. No. 3,530,892 define a plunger having axial bore therein in a passageway communicating with the actual bore, spring means are used to urge the plunger towards the cylindrical valve element. The device is arranged to provide a gas-tight communication between between the passageway in the cylindrical valve member and the port in which the plunger is mounted. Patent 2,868,499 discloses a plug type valve having bearing elements extending beyond the surface of the valve element in a constant fixed relation and French Pat. No. 1,452,634 discloses a multiple port valve design utilizing a pair of oppositely disposed O-rings to seal around each aligned port of the metal valve element.

The present invention provides the novel highly efficient compressed resilient elastic rubber plugs in a cylindrical valve member positioned for registry with the ports, the plugs being so formed as to bulge into the ports after effectively wiping the same when the valve element is moved to a closed position due to their oversize relationship in relation to the ports and their mounting cavity.

SUMMARY OF THE INVENTION

A multiple port valve comprises a valve body having a cylindrical bore therethrough with a cylindrical valve member positioned in said cylindrical bore and rotated on its longitudinal axis. Oppositely disposed inlet and outlet ports are formed in the valve body and communicate with the cylindrical bore and transverse passageways in the cylindrical valve member are positioned to move into alignment and registry with the inlet and outlet ports to permit the passage of fluids therethrough. Resilient elastic rubber plugs are compressed and held in oppositely disposed pockets in the cylindrical valve member being arranged to move into effective sealing expanding relation within the oppositely disposed inlet and outlet ports when the cylindrical valve member is rotated on its longitudinal axis to a second position.

A modification of the multiple port valve incorporates a secondary passageway extending through one of the resilient plugs to the exterior of the cylindrical valve member so that a port may be vented thereby to the atmosphere which is particularly useful when one of the passageway controlled by the multiple ported valve is in control of a compressed air line.

Description of the Preferred Embodiment

Figure 1:
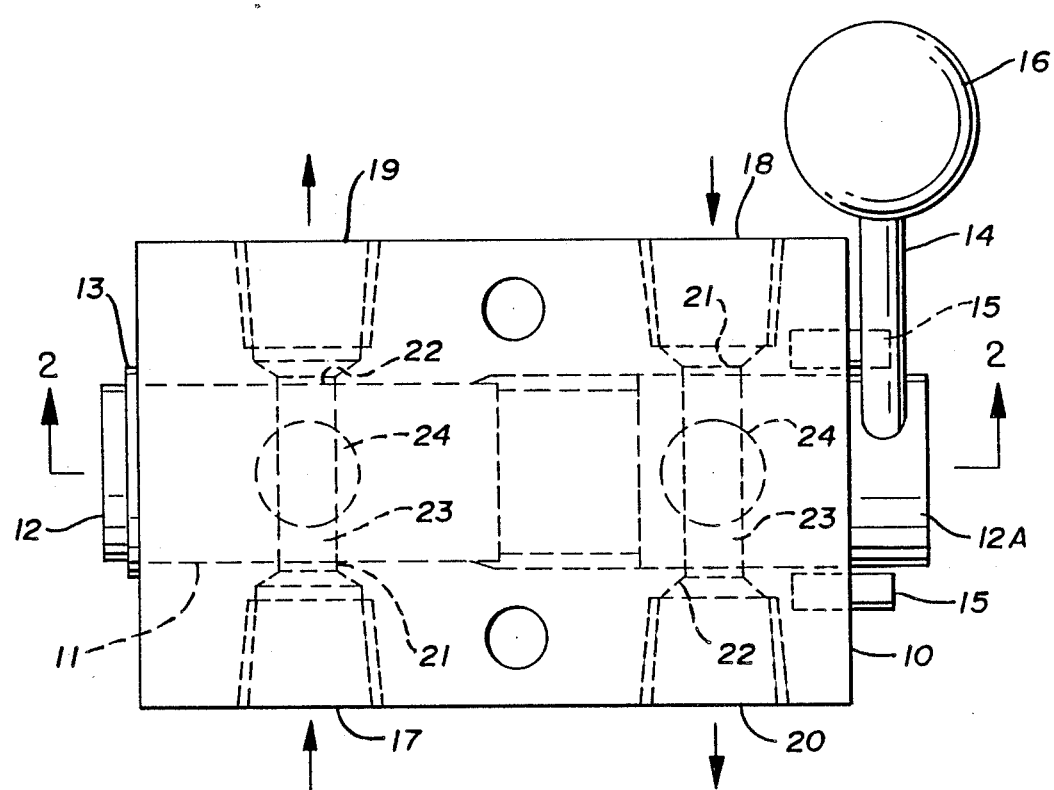
FIG. 1 is a side elevation of a multiple port valve with broken lines indicating the transverse bore, cylindrical valve member and oppositely disposed inlet and outlet ports and the resilient elastic compressed rubber plugs.

By referring to the drawings and FIG. 1 in particular it will be seen that a valve body 10 is provided with a cylindrical bore 11 in which a cylindrical valve member 12 is positioned for rotary motion on its longitudinal axis. The cylindrical valve member 12 extends outwardly of the opposite ends of the valve body 10 and a retaining snap ring 13 is engaged in an annular groove in one end while an arm 14 is engaged in the opposite end of the cylindrical valve member so that the same can be rotated at least partially on its longitudinal axis within limits defined by a pair of spaced stop pins 15. A ball handle 16 is positioned on the end of the arm 14 to form a convenient means of applying rotary motion to the cylindrical valve member 12. Two pairs of inlet ports 17 and 18 and outlet ports 19 and 20 are formed in the valve body 10. The inlet and outlet ports 17 and 19 are arranged opposite one another in the valve body 10 and communicate by way of reduced areas 21 and 22 with the cylindrical bore 11. The inlet and outlet ports 18 and 20 have similar reduced areas 21 and 22 respectively which also communicate with the cylindrical bore 11. The inlet and outlet ports 17 and 19 and 18 and 20 respectively are spaced with respect to one another longitudinally of the cylindrical bore 11. Transverse passageways 23 in the cylindrical valve member 12 are spaced longitudinally thereof for registry with the reduced areas 21 and 22 respectively of each of the pairs of inlet and outlet ports 17 and 19 and 18 and 20 respectively. Broken lines in FIG. 1 of the drawings illustrate the passageways 23 in communication with the inlet and outlet ports so that coolant fluid, for example, delivered to inlet port 17 will flow through the transverse passageway 23 and out of the outlet port 19 and to an article to be cooled such as an electric resistant welding tip or the like from which the coolant is returned by tubular connections, not shown, to the inlet port 18 where it flows through the passageway 23 in the cylindrical valve member 12 and out of the outlet port 20 to the source of the coolant fluid. Broken lines in FIG. 1 of the drawings indicated by the reference numeral 24 illustrate pockets of a known dimension in which resilient elastic rubber plugs 25 are positioned. The plugs 25 are of a determined dimension greater than that of said pockets 24 requiring the plugs 25 to be compressed for insertion into the respective pockets 24.

Figure 2:
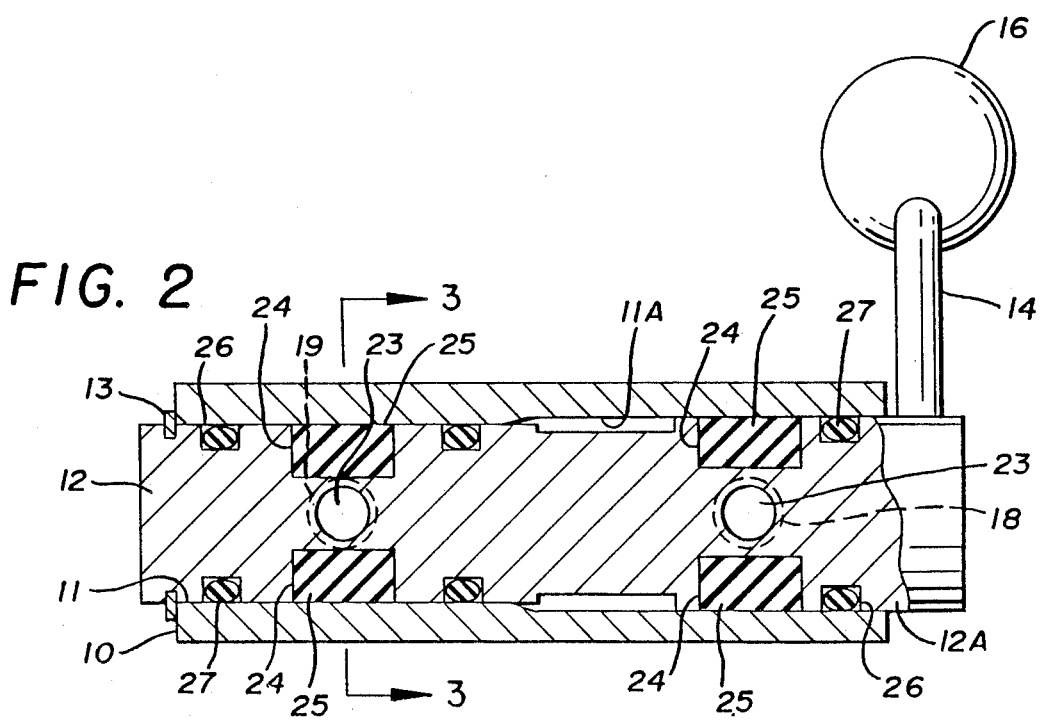
FIG. 2 is a longitudinal section on lines 2—2 of FIG. 1.

By referring to FIG. 2 of the drawings, it will be seen that the cylindrical bore 11 in the valve body 10 is preferrably formed in two diameters, the larger one of which is indicated by the reference 11A and that the cylindrical valve member 12 is also formed in two diameters, the larger one of which is indicated by the reference 12A. Annular grooves 26 are formed in the cylindrical valve body 12 and O-rings 27 are positioned therein to form annular seals as known in the art.

In FIG. 2 of the drawings the resilient elastic rubber plugs 25 positioned under compression in their respective pockets 24 will be seen out of registry with the reduced areas 22 and 21 respectively which are as in FIG. 1 of the drawings in communication with the transverse passageways 23 in the cylindrical valve member 12. By referring now to FIG. 3 of the drawings, it will be seen that the communication established by one of the transverse passageways 23 in the cylindrical valve member 12 with the reduced areas 21 and 22 respectively of the inlet and outlet ports 17 and 19 respectively and it will be observed that the pockets 24 in the cylindrical valve member 12 is which the resilient elastic rubber plugs 25 are positioned are at right angles to the passageway 23.

It will occur to those skilled in the art that any fluid moving between the cylindrical valve member 12 and the cylindrical bore 11 will be confined by the plurality of O-ring seals 27 hereinbefore described and illustrated in FIG. 2 of the drawings.

Figure 3:
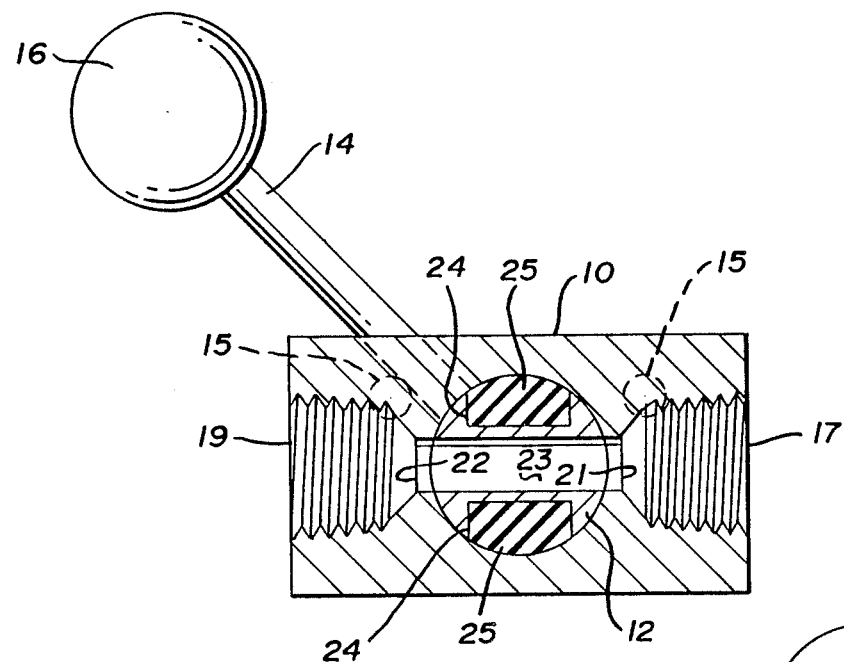
FIG. 3 is a vertical section on lines 3—3 of FIG. 2 with the transverse passageway in the cylindrical valve member in registry with the inlet and outlet ports of the valve.
Figure 4:
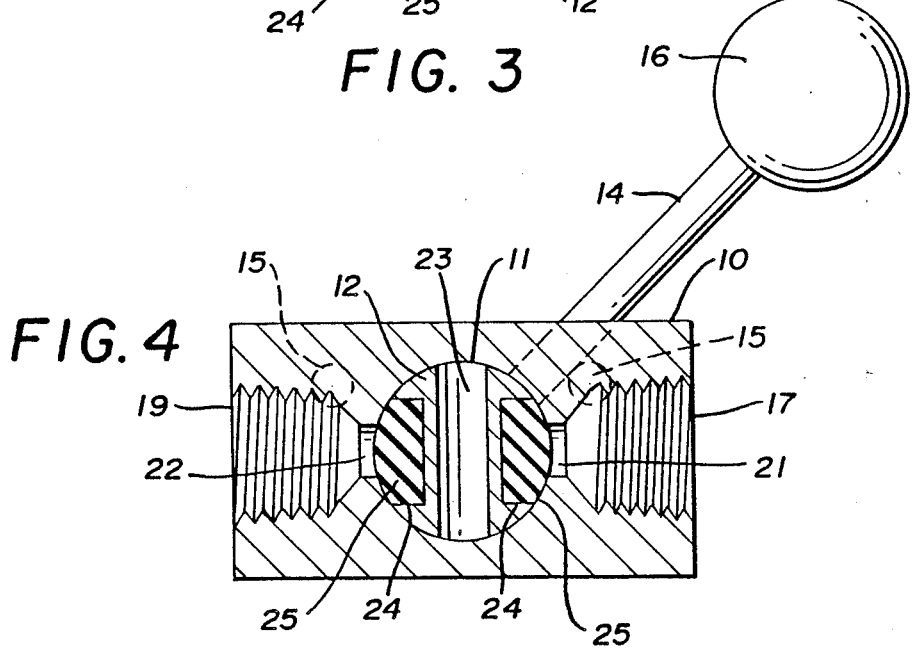
FIG. 4 is a cross-sectional elevation like FIG. 3 showing the resilient elastic rubber compressed plugs in positive sealing relation with the inlet and outlet ports of the valve.

Referring now to FIG. 4 of the drawings, the cylindrical valve member 12 in the cylindrical bore 11 will be seen to have been rotated approximately 90° on its longitudinally axis from the position illustrated in FIG. 3 of the drawings, the motion having been imparted by the moment of the arm 14. In the second position of the cylindrical valve member 12 illustrated in FIG. 4, the resilient elastic rubber plugs 25 which are of an expanded surface area twice that of said reduced areas 21 and 22 will be seen to have been moved into wide overlapping registry with the reduced areas 12 and 22 of the inlet and outlet ports 17 and 19 respectively and that by reason of their expansive characteristics imparted by compression upon insertion, portions of the resilient elastic rubber plugs 25 have expanded into the reduced areas 21 and 22 after having wiped the same clean of any foreign materials and thus insuring a positive leak proof seal.

It will be evident that the expansion characteristics of the elastic rubber plugs 25 expanding into the reduced areas 21 and 22 impart a positive locking positioning of the arm 14. This positive positioning of the arm 14 and its interconnected valve member 12 is important since the rotation of the valve member 12 to the open position against requires a conscience effort on the arm 12 to overcome the expanded nature of the rubber plug 25 to compress same as the valve member 12 is rotated to an open position.

The compressive force of the elastic rubber plug 25 within the pockets 24 is greater than that of the relative fluid pressure within the inlet 21 allowing the plugs to bulge and expand into the inlet portion 21 against the positive fluid pressure within during use.

Those skilled in the art will appreciate that when the multiple port valve hereinbefore described in positioned to control coolant supply and return lines to an electric resistant welding tip or the like, a single motion imparted to the arm 14 will move the communicating passageways 23 out of registry with the inlet and outlet ports and simultaneously position the resilient elastic rubber plugs 27 in registry therewith, thus completely controlling the fluid in the supply and return coolant lines. After the welding tip has been replaced a single motion of the arm 14 will reposition the transverse passageways 23 in communication with the supply and return coolant lines respectively.

Figure 5:
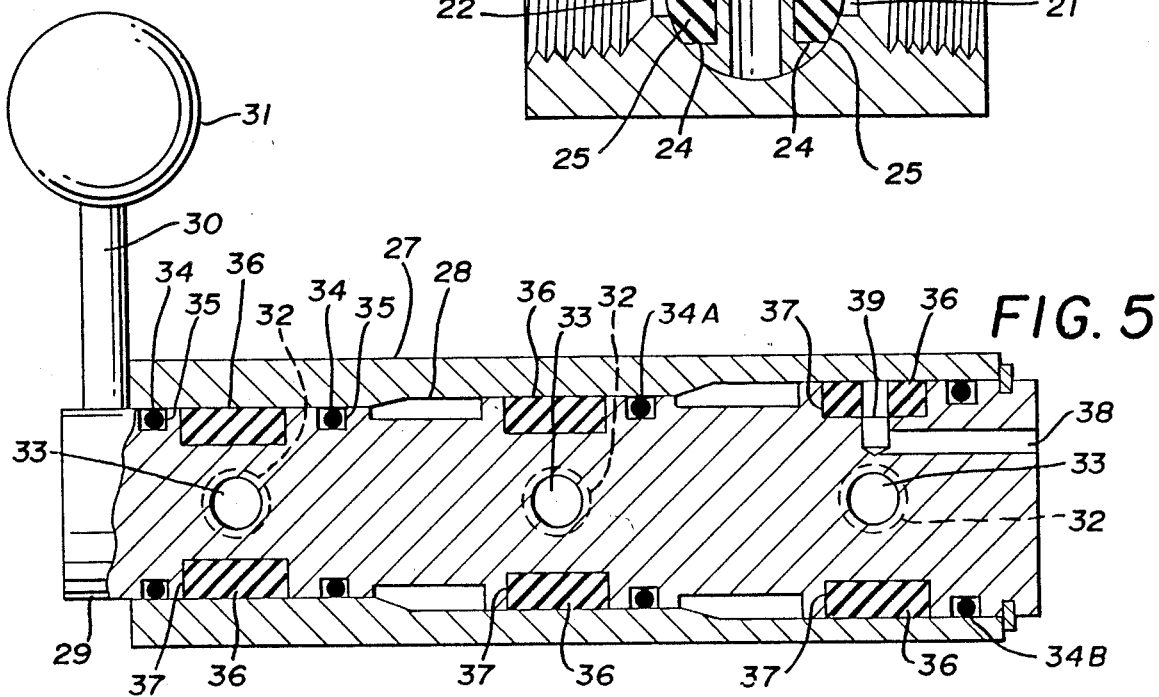
FIG. 5 is a vertical section of a modified valve illustrating three fluid controlling passageways in the cylindrical valve member and three pairs of resilient elastic rubber compressed plugs one of which is apertured to form an extension of a venting passageway.

Those skilled in the art will appreciate that modifications in the valve disclosed herein are possible and one such modification is illustrated in FIG. 5 of the drawings. By referring thereto it will be seen that a valve body 27 has a cylindrical bore 28 axially thereof, the bore being formed in several different diameters and a cylindrical valve member 29 is positioned therein. An arm 30 is attached to one end of the cylindrical valve member 29 and it is provided with a ball 31 for convenient manipulation. Stop pins, not shown, preferably restrict the rotary motion imparted the cylindrical valve element 29 to approximately 90°. Inlet and outlet bores 32 like those hereinbefore illustrated and described in connection with FIGS. 1, 3, and 4 of the drawings are provided in the valve body 27 for registry with a plurality of transverse passageways 33 in the cylindrical valve member 29. O-rings 34 A and B and C positioned in annular grooves 35 separate the transverse passageways 33 from one another and oppositely disposed pairs of resilient elastic rubber plugs 36 are compressed and positioned in pockets 37 positioned in circumferentially spaced relation to the transverse passageways 33 and oppositely disposed relation to one another so that they will move into bulging expanded sealing relation with the inlet and outlet ports 32 when the cylindrical valve member 29 is rotated on its axis.

Still referring to FIG. 5 of the drawings, it will be seen that the right end portion of the multiple port valve illustrated therein and more particularly the right end portion of the cylindrical valve member 29 has a longitudinally extending relatively short air venting passageway 38 formed therein which communicates with a short right angular passageway 39 positioned centrally of and extending through the resilient plug 36 in the upper portion of the figure. The air vent passageway 38 thus extends from atmosphere through the center of the indicated resilient plug 36 so that it will communicate by way of the passageway 39 with the outlet port 32 with which the resilient plug 36 will register when the valve is closed. When the apparatus with which the multiple port valve of FIG. 5 is used includes an air operated device the air supply for the same is controlled by the passageway 33 and the resilient plugs 36 in the right hand portion of the device illustrated in FIG. 5 of the drawings. It will occur to those skilled in the art that when the passageway 33 moves out of registry with the communication inlet and outlet ports, the passageways 39 in one of the resilient plugs 36 will move into communication with the air passageway and vent same and/or relieve pressure therein as may be necessary to the efficient operation of the air operated device.

It will thus be seen that a new simple and relatively inexpensive multiple port valve has been illustrated and disclosed which is particularly useful in the hereinbefore described environment and that various changes and modifications may be made therein without departing from the spirit of the invention, therefore I claim:

1. An improvement in a multiple port valve having a valve body with a cylindrical bore therethrough, at least a pair of fluid flow passageways extending through said valve body intersecting said cylindrical bore transverse thereto and having outlets on one side of said bore and inlets on the opposite side of said bore, a cylindrical valve member rotatably positioned in said bore, secondary bores extending through said valve member forming parts of said passageways when said valve member is in a first position; the improvement comprising pockets in said valve member circumferentially spaced with respect to said secondary bores therein and positioned for registry with said passageways intersecting said cylindrical bore when said valve member is in a second position and compressed elastic rubber plugs in said pockets for expansion into and sealing said passageways intersecting said cylindrical bore whereby said cylindrical valve member may be rotated from said first position with said secondary registering with said passageways to said second position with said elastic rubber plugs closing said passageways against a known fluid pressure within.

2. The improvement in a multiple port valve set forth in claim 1 wherein there are oppositely disposed pairs of said pockets in said valve member and oppositely disposed pairs of said compressed elastic rubber plugs in said pockets.

3. The improvement in the multiple port valve set forth in claim 1 and wherein there are oppositely disposed pairs of said pockets in said valve member and oppositely disposed pairs of compressed elastic plugs positioned in said pockets and wherein said oppositely disposed pairs of said pockets are positioned at an angle of about 90° to said secondary bores extending through said valve member.

4. The improvement in the multiple port valve set forth in claim 1 and wherein said compressed elastic rubber plugs in said pockets are characterized by their ability to forceably wipe said cylindrical bore around said fluid flow passageways intersecting same and to expand into said fluid flow passageways so as to insure sealing the same when said valve member moves towards and into said second position.

5. The improvement in a multiple ported valve set forth in claim 1 and wherein said compressed elastic rubber plugs in said pockets once expanded into sealing relation in said passageways intersecting said cylindrical bores have an expanded suface area twice that of said passageways.

6. The improvement in the muliple port valve set forth in claim 1 wherein said compressed elastic rubber plugs are expandable against the known fluid pressure within said passageways.

* * * * *